United States Patent
Lacey et al.

(10) Patent No.: US 10,354,090 B2
(45) Date of Patent: Jul. 16, 2019

(54) SYSTEMS AND METHODS FOR CONTEXT-BASED PERMISSIONING OF PERSONALLY IDENTIFIABLE INFORMATION

(71) Applicants: Stuart H. Lacey, Paget (BM); Naresh Singhal, Fremont, CA (US); Douglas Cheline, San Jose, CA (US)

(72) Inventors: Stuart H. Lacey, Paget (BM); Naresh Singhal, Fremont, CA (US); Douglas Cheline, San Jose, CA (US)

(73) Assignee: Trunomi Ltd., Paget (BM)

( * ) Notice: Subject to any disclaimer, the term of this patent is extended or adjusted under 35 U.S.C. 154(b) by 0 days.

(21) Appl. No.: 14/874,345

(22) Filed: Oct. 2, 2015

(65) Prior Publication Data

US 2016/0104008 A1 Apr. 14, 2016

Related U.S. Application Data

(60) Provisional application No. 62/059,087, filed on Oct. 2, 2014.

(51) Int. Cl.
*G06F 21/62* (2013.01)
*G06Q 30/02* (2012.01)

(52) U.S. Cl.
CPC ...... *G06F 21/6263* (2013.01); *G06F 21/6245* (2013.01); *G06Q 30/0251* (2013.01)

(58) Field of Classification Search
CPC ............ G06F 21/6245; G06F 21/6263; G06Q 30/0251

(Continued)

(56) References Cited

U.S. PATENT DOCUMENTS 5,734,720 A * 3/1998 Salganicoff .......... G06Q 20/383
348/E7.056
6,640,304 B2 10/2003 Ginter et al.
(Continued)

FOREIGN PATENT DOCUMENTS

EP 2779038 A1 9/2014

OTHER PUBLICATIONS

Trunomi Ltd., International Search Report and Written Opinion, PCT/IB2015/002132, dated Feb. 23, 2016, 12 pgs.
(Continued)

*Primary Examiner* — Eric W Shepperd
*Assistant Examiner* — Peiliang Pan
(74) *Attorney, Agent, or Firm* — Morgan, Lewis & Bockius LLP

(57) ABSTRACT

A method is provided, including establishing a plurality of context profiles for a user, at least one context profile is associated with: (i) subject areas pertinent to the at least one context profile (ii) permissions identifying respective third parties with which personal information can be shared when the at least one context profile is active; (iii) permissions identifying what personal information can be shared with respective third parties when the at least one context profile is active; (iv) permissions identifying respective third parties that are permitted to contact the user when the at least one context profile is active; and (v) permissions identifying how respective third parties may contact the user when the at least one context profile is active; when the at least one context profile is active, operating in one of two or more modes (e.g., a regular mode or a discovery mode).

16 Claims, 8 Drawing Sheets

(58) Field of Classification Search
USPC .......................................... 726/4, 17, 28, 29
See application file for complete search history.

(56) References Cited

U.S. PATENT DOCUMENTS

| | | | |
|---|---|---|---|
| 7,929,951 B2 | 4/2011 | Stevens | |
| 8,150,877 B1 | 4/2012 | Wood | |
| 8,370,626 B2 | 2/2013 | Liu et al. | |
| 8,494,961 B1 | 7/2013 | Lucas et al. | |
| 8,631,158 B1* | 1/2014 | Michaelis | G06Q 30/02 |
| | | | 455/414.1 |
| 9,189,788 B1 | 11/2015 | Robinson | |
| 9,449,182 B1* | 9/2016 | Dang | G06F 17/30011 |
| 9,798,825 B1 | 10/2017 | Goldman | |
| 2003/0152622 A1* | 8/2003 | Louie-Helm | A61K 9/0065 |
| | | | 424/468 |
| 2004/0053470 A1* | 3/2004 | Lee | H01L 29/1054 |
| | | | 438/285 |
| 2004/0154022 A1 | 8/2004 | Boss et al. | |
| 2005/0027707 A1* | 2/2005 | Syed | G06Q 30/02 |
| 2005/0289180 A1 | 12/2005 | Pabla | |
| 2007/0165623 A1* | 7/2007 | Clark | H04L 67/24 |
| | | | 370/389 |
| 2007/0198281 A1* | 8/2007 | Abernethy, Jr. | G06Q 10/109 |
| | | | 709/204 |
| 2008/0132251 A1* | 6/2008 | Altman | G06Q 30/0207 |
| | | | 455/457 |
| 2008/0208774 A1 | 8/2008 | Kim et al. | |
| 2009/0070371 A1 | 3/2009 | Cunningham et al. | |
| 2009/0080404 A1 | 3/2009 | Laurila et al. | |
| 2009/0083643 A1 | 3/2009 | Beringer | |
| 2009/0171964 A1* | 7/2009 | Eberstadt | G06F 17/30873 |
| 2009/0234728 A1 | 9/2009 | Willuns | |
| 2010/0067679 A1 | 3/2010 | Lei | |
| 2010/0077484 A1 | 3/2010 | Paretti et al. | |
| 2010/0161969 A1 | 6/2010 | Grebovich | |
| 2011/0030067 A1* | 2/2011 | Wilson | G06F 21/6245 |
| | | | 726/27 |
| 2011/0040736 A1 | 2/2011 | Kalaboukis et al. | |
| 2011/0040836 A1 | 2/2011 | Allen et al. | |
| 2011/0067098 A1 | 3/2011 | Nelson et al. | |
| 2011/0137946 A1* | 6/2011 | Siress | G06F 21/6227 |
| | | | 707/784 |
| 2011/0179126 A1* | 7/2011 | Wetherell | H04L 51/36 |
| | | | 709/206 |
| 2011/0194472 A1* | 8/2011 | Bahr | H04L 45/00 |
| | | | 370/311 |
| 2011/0320441 A1* | 12/2011 | Lee | G06F 17/30867 |
| | | | 707/723 |
| 2012/0020470 A1* | 1/2012 | Staudte | H04M 3/42153 |
| | | | 379/211.02 |
| 2012/0036081 A1 | 2/2012 | Hatter et al. | |
| 2012/0203880 A1* | 8/2012 | Kluyt | G06F 9/54 |
| | | | 709/223 |
| 2012/0253898 A1 | 10/2012 | Berus | |
| 2013/0007849 A1 | 1/2013 | Coulter | |
| 2013/0018907 A1 | 1/2013 | Kuhn et al. | |
| 2013/0103759 A1 | 4/2013 | Blom | |
| 2013/0155409 A1* | 6/2013 | Bogdanowicz | G01N 21/1717 |
| | | | 356/445 |
| 2013/0166651 A1 | 6/2013 | Joshi | |
| 2013/0185359 A1 | 7/2013 | Liu et al. | |
| 2013/0194577 A1* | 8/2013 | Bogdanowicz | G01N 21/55 |
| | | | 356/447 |
| 2013/0204786 A1 | 8/2013 | Mattes et al. | |
| 2013/0240618 A1* | 9/2013 | Hall | G06F 17/30873 |
| | | | 235/375 |
| 2013/0262305 A1 | 10/2013 | Jones | |
| 2014/0064112 A1 | 3/2014 | Das et al. | |
| 2014/0074928 A1 | 3/2014 | B'Far | |
| 2014/0082074 A1* | 3/2014 | Workman | H04L 67/10 |
| | | | 709/204 |
| 2014/0082099 A1 | 3/2014 | Burns | |
| 2014/0087711 A1 | 3/2014 | Geyer et al. | |
| 2014/0114991 A1* | 4/2014 | Campbell | G06F 17/00 |
| | | | 707/754 |
| 2014/0188626 A1 | 7/2014 | Biswas | |
| 2014/0201081 A1 | 7/2014 | Neuwirth | |
| 2014/0267135 A1 | 9/2014 | Chhabra | |
| 2015/0029978 A1 | 1/2015 | Tranberg | |
| 2015/0061859 A1* | 3/2015 | Matsuoka | G08B 27/00 |
| | | | 340/501 |
| 2015/0150074 A1 | 5/2015 | Nolan et al. | |
| 2015/0163412 A1* | 6/2015 | Holley | G05B 15/02 |
| | | | 348/143 |
| 2016/0191355 A1 | 6/2016 | Joshi | |

OTHER PUBLICATIONS

Trunomi Ltd., International Search Report and Written Opinion, PCT/IB2015/002575, dated Mar. 21, 2016, 12 pgs.
Trunomi Ltd., International Preliminary Report on Patentability, PCT/IB2015/002132, dated Apr. 4, 2017, 9 pgs.
Trunomi Ltd., International Preliminary Report on Patentability, PCT/IB2015/002575, dated Apr. 4, 2017, 9 pgs.
Trunomi Ltd., Communication Pursuant to Rules 161(1) and 162, EP15813902.2, dated May 12, 2017, 2 pgs.
Lacey, International Search Report and Written Opinion, PCT/IB2016/000156, dated May 18, 2016, 11 pgs.
Lacey, Communication Pursuant to Rules 161(1) and 162—EP16710799.4, dated Oct, 20, 2017, 2 pgs.
Trunomi Ltd., Communication Pursuant to Article 94(3), EP15813902.2, dated Oct. 31, 2018, 8 pgs.
White, Ron, How Computers Work, Oct. 15, 2003, Que Publishing, 7th Ed., p. 4.

* cited by examiner

SYSTEMS AND METHODS FOR CONTEXT-BASED PERMISSIONING OF PERSONALLY IDENTIFIABLE INFORMATION

CROSS REFERENCE TO RELATED APPLICATIONS

This application claims priority to U.S. Provisional Patent Application No. 62/059,087, "Systems and Methods for Context-Based Permissioning of Personally Identifiable Information" filed Oct. 2, 2014, which is hereby incorporated by reference in its entirety.

TECHNICAL FIELD

The disclosed implementations relate generally to systems and methods context-based permissioning of personally identifiable information.

BACKGROUND

Personally identifiable information, or "PII," is information that can be used, either alone or in combination with other information, to uniquely identify a particular person. In the modern computing age, users generate significant amounts of PII in their day-to-day lives, often without awareness that they are doing so, or without appreciating the extent to which the information allows them to be uniquely identified. As devices are able to collect increasingly more data about users (and more sensitive data, such as health information, location information, etc.), privacy concerns about PII are becoming more germane.

Currently, each collector of PII is responsible for informing users what data is being collected and how it is being used and for what purpose. However, with so many different entities collecting, storing, and using a person's PII, it is difficult for people to understand exactly which entities they have permitted to collect their PII, and what those entities are permitted to do with their PII. Many such agreements allow the collector of PII to a fair amount of freedom in usage to do what they choose with the PII, and at any time. Thus, users are typically not in control of who has their PII, how it is being used, and when. Regulators and governments are becoming increasingly aware of this problem, and are looking to enact legislation which will mandates how and which controls be put in place.

Moreover, most agreements governing an entities rights and responsibilities with respect to PII are non-negotiable "take it or leave it" type of agreements—the user must either accept the terms, or forgo using a particular service. For example, the terms of use governing a blood-pressure monitoring application and/or device may authorize the provider to record and store blood-pressure information, and, possibly, share the information with third parties. Such agreements do not allow the user to provide any restrictions, for example, on the when the provider can record data, when the data can be shared, what the data can be used for, or who it can be shared with. Users could simply refuse to agree to the stated terms, but then they will be unable to use the service or device. In other instances, agreements are so complex and long that the majority of users are either unqualified or unable to understand the right they are providing. Such extensive "catch all" user agreements also create an impediment for users to understand or even appreciate the extent of their permissions. Accordingly, users are left with a choice between authorizing sweeping access to sensitive PII, or being unable to use beneficial and valuable modern technologies. For various reasons, users often accept the terms, thus giving up substantial control of sensitive PII.

SUMMARY

Accordingly, it would be advantageous to provide systems and methods that allow users to control what PII information is shared, with whom it is shared, and when it is shared. Moreover, it would be advantageous to provide systems, methods, and user interfaces whereby users can control multiple types of PII and multiple consumers of PII in a single, easy to understand and easy to use environment.

In accordance with some implementations, a method for providing access to personal information of a user is disclosed. The method is performed at one or more electronic devices (e.g., a client device and/or a server system with one or more electronic devices) with one or more processors and memory storing one or more programs for execution by the one or more processors. The method includes establishing a plurality of context profiles for a user, wherein at least one context profile of the plurality of context profiles is associated with: (i) a set of one or more subject areas pertinent to the at least one context profile (e.g., gas-stations and fast food restaurants are example subject areas that may be associated with a "travel" context profile); (ii) a first set of one or more permissions identifying respective third parties with which personal information can be shared when the at least one context profile is active; (iii) a second set of one or more permissions identifying what personal information can be shared with respective third parties when the at least one context profile is active; (iv) a third set of one or more permissions identifying respective third parties that are permitted to contact the user when the at least one context profile is active; and (v) a fourth set of one or more permissions identifying how respective third parties may contact the user when the at least one context profile is active. The method further includes, when the at least one context profile is active, operating in one of two or more modes. The method includes, in a regular mode, performing at least one of: sharing personal information with respective third parties in accordance with the first set of one or more permissions and the second set of one or more permissions; and receiving information from respective third parties in accordance with the third set of one or more permissions and the fourth set of one or more permissions. The method further includes, in a discovery mode, performing at least one of: (i) sharing personal information with first additional third parties in accordance with an expanded version of the first set of one or more permissions, wherein the first additional third parties are each associated with at least one subject area of the set of one or more subject areas pertinent to the at least one context profile; (ii) sharing additional personal information with respective third parties in accordance with an expanded version of the second set of one or more permissions; (iii) receiving information from second additional third parties in accordance with an expanded version of the third set of one or more permissions, wherein the second additional third parties are each associated with at least one subject area of the set of one or more subject areas pertinent to the at least one context profile; and (iv) receiving information from respective third parties in accordance with an expanded version of the fourth set of one or more permissions.

In accordance with some embodiments, the fourth set of one or more permissions identifying how third parties may contact the user includes, a first subset of permissions identifying times when third parties are permitted to contact the user, and a second subset of permissions identifying communication types that third parties are permitted to use to contact the user.

In accordance with some embodiments, the fourth set of one or more permissions identifying how third parties may contact the user includes, a third subset of permissions identifying times when third parties are not permitted to contact the user, and a fourth subset of permissions identifying communication types that third parties are not permitted to use to contact the user.

In accordance with some embodiments, the method further includes, receiving a permission from the user to enter the discovery mode from the regular mode.

In accordance with some embodiments, the method further includes, when the at least one context profile is active, in an emergency mode, sharing personal information with respective third parties.

In accordance with some embodiments, the method further includes, when the at least one context profile is active, determining a mode automatically without user input.

In accordance with some embodiments, the plurality of context profiles is stored on a first electronic device of the one or more electronic devices, and the personal information of the user is stored on a second electronic device of the one or more electronic devices, such that the second electronic device is distinct from the first electronic device.

In accordance with some implementations, a computer system (e.g., a client system or server system) includes one or more processors, memory, and one or more programs; the one or more programs are stored in the memory and configured to be executed by the one or more processors and the one or more programs include instructions for performing the operations of the method described above. In accordance with some implementations, a non-transitory computer readable storage medium has stored therein instructions which when executed by one or more processors, cause a computer system (e.g., a client system or server system) to perform the operations of the methods described above.

The disclosed systems and methods put the individual in control of his or her personally identifiable information, and allow fine-grained control over how, when and with whom it is shared. Indeed, the disclosed systems and methods enable a change in the current PII paradigm where individuals must agree to terms-and-conditions that grant a requestor sweeping permissions, allowing corporations and other entities to decide what data they collect and store, and how and when they can use it. Rather, control over PII is returned to the individual where it belongs. Moreover, by automatically determining active context profiles, user can preset their desired permissions, and then be assured that those permissions will be observed even without the user affirmatively changing the permissions or selecting an active profile.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1A:
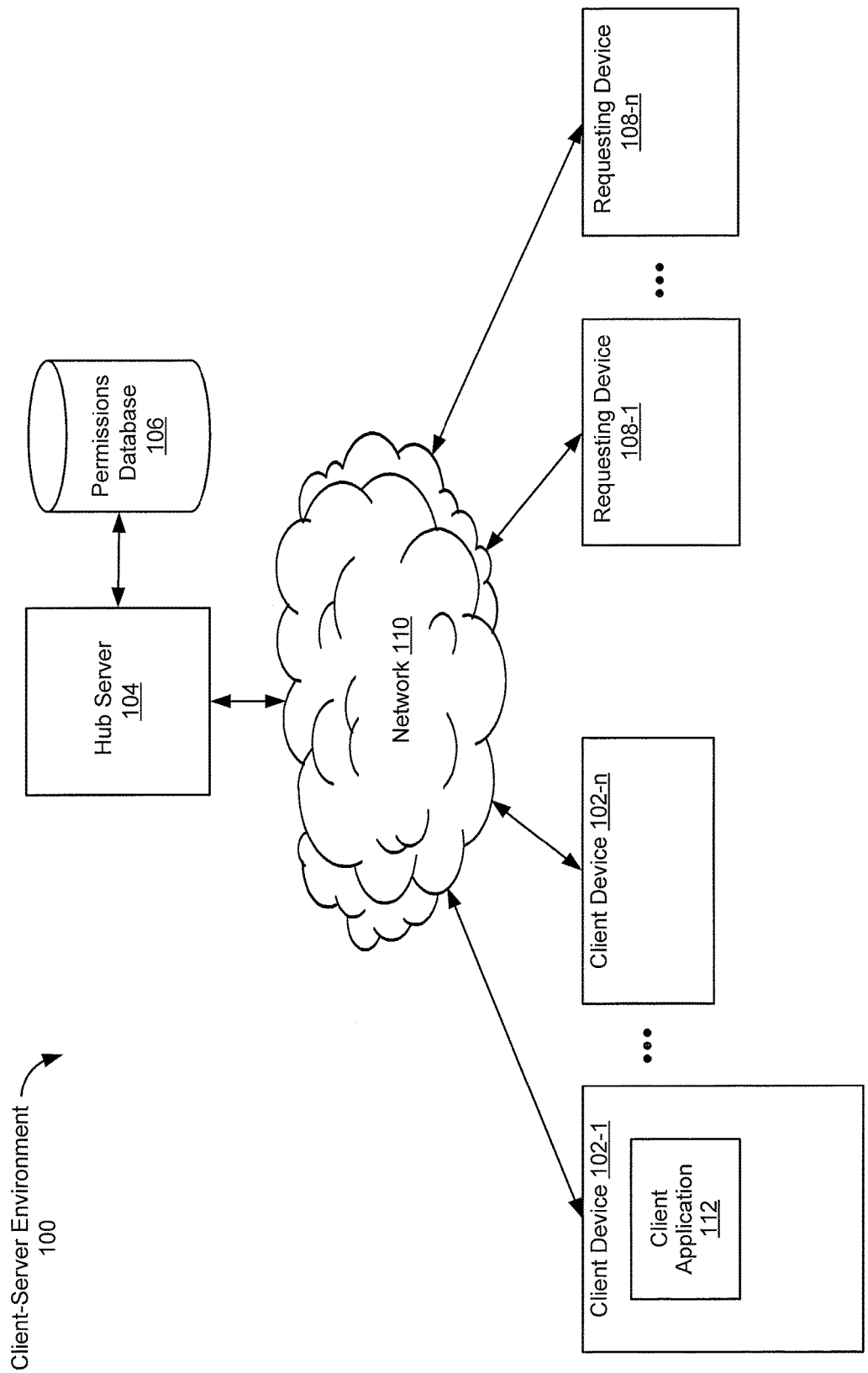
FIGS. 1A-1B are block diagrams illustrating a client-server environment, in accordance with some implementations.

Attention is now directed to the figures, and in particular to FIG. 1A, which is a block diagram of a client-server environment 100, according to some implementations, in which context-specific sharing permissions are facilitated by a central hub server. The client-server environment 100 includes client devices 102-1 . . . 102-n, a hub server 104, and requesting devices 108-1 . . . 108-n, all connected through a network 110. The network 110 includes any of a variety of networks, including wide area networks (WAN), local area networks (LAN), Personal Area Networks, metropolitan area networks, VPNs, local peer-to-peer, ad-hoc connections, wireless networks, wired networks, the Internet, or a combination of such networks.

In some implementations, the client device 102-1 is associated with an individual. In some implementations, the client device 102-1 includes a client application 112 that facilitates the transmission of PII to other devices, such as the hub server 104 and/or requesting devices 108-n. In some implementations, the client application 112 also facilitates receipt of information (e.g., targeted advertisements and/or other content) from other devices, such as the hub server 104 and/or requesting devices 108-n. In some implementations, the PII transmitted from the client device 102-1 to other devices includes information resulting from direct interactions with the client device 102-1 (e.g., internet browsing history, user profiles, location information, application usage information, device operational information/logs, etc.). In some implementations, the PII transmitted from the client device 102-1 to other device includes information received by the client device 102-1 from other devices and/or peripherals, such as wearables, heart-rate monitors, occupancy sensors, health/medical/biometric sensors, connected home devices, drones, autonomous vehicles, other computing devices, etc.

In some implementations, the client device 102-1 also facilitates requesting and receiving user consent for sharing of PII, including sharing of PII from the client device 102-1 to other devices and/or entities, and/or sharing of PII between other third-parties. For example, a user may be prompted, via the client device 102-1, to approve or deny a request for one third-party to share that user's PII with another third-party.

In some implementations, the client device 102-1 also maintains or facilitates maintenance of an "active" context profile of a user. An active context profile, discussed herein, relates to one or more aspects of the user's current environment, current activity, and/or current interests. Context profiles include, for example, contexts such as "travel," "home," "shopping," "driving," "do not disturb," "fitness," "health emergency," "work," "social," and the like. In some implementations, the client device 102-1 automatically determines an active context profile. This determination can be based on any one or more of the following factors and/or criteria: time of day, device or application usage, browsing history, location (e.g., from GPS or otherwise), ambient light, ambient temperature, biometric information (e.g., from a biometric sensor), connected devices/accessories (e.g., wearables, or a car's technology system), and the like. In some implementations, other devices in addition to or instead of the client device 102-1 maintain or facilitate maintenance of an active context profile. For example, the hub server 104 may communicate with the client device 102-1 to maintain the user's active context profile. As another example, peripheral devices may provide signals to the client device 102-1 and/or the hub server 104. These signals are indicative of a user's context, or can be used, alone or in combination with other signals, data, calendar entries, etc., to infer the user's context.

In some implementations, the client application 112 encrypts the PII prior to sending it to the hub server 104 and/or the requesting devices 108-n. The client device 102-1 and the client application 112, and the functions and methods that they perform, are discussed herein. Any description(s) of the client device 102-1, or of the functions or methods performed by the client device 102-1, apply equally to any or all instances of the client devices 102-n. Exemplary client devices include a desktop computer, a laptop computer, a tablet computer, a mobile electronic device (e.g., a "smart watch," a wearable electronic device, a fitness/health tracker, etc.), an internal electronic device (e.g., a security, monitoring, or medical device), a mobile phone (e.g., a "smartphone"), a digital media player, or any other appropriate electronic device.

In some implementations, the requesting device 108-1 is associated with an entity that receives, stores, uses, or otherwise accesses PII of an individual. For example, a requesting device 108-1 may be associated with an entity or entities that use PII for any one or more of the following reasons: targeting advertisements (or other content) to particular individuals; sharing PII with other entities; aggregating and/or storing PII.

In some implementations, the requesting device 108-1 communicates with one or both of the hub server 104 and the client device 102-1. The requesting device 108-1 and the functions and methods that it performs are discussed herein. Any description(s) of the requesting device 108-1, or of the functions or methods performed by the requesting device 108-1, apply equally to any or all instances of the requesting devices 108-n. Exemplary requesting devices include a desktop computer, a laptop computer, a tablet computer, a mobile electronic device, a server computer (or server computer system), a mobile phone, a digital media player, or any other appropriate electronic device (or a kiosk housing any of the aforementioned devices). Exemplary devices may also include vehicles that contain such devices including cars, airplanes, trains and the like—or occupancy spaces containing such devices including buildings, common areas, open spaces, natural environments and the like.

In some implementations, the hub server 104 is associated with a service provider that can communicate, via the network 110 and/or other communication means, with multiple client devices (e.g., 102-n) and multiple requesting devices (e.g., 108-n) to provide and/or facilitate permissioning the sharing of PII between entities (including between individuals and third-party entities, and between two or more third-party entities). In some implementations, the hub server 104 includes and/or communicates with a permissions database 106. As described herein, the permissions database 106 stores permission information associated with users, including, but not limited to, previously granted permissions for requesting entities to access, use, or share PII; the context profiles under which PII (or certain types of PII) may be shared, accessed, or used by requesting entities; etc. As a specific example, the permissions database 106 stores information indicating that a particular user's heart rate information may be shared with a first subset of third parties when the user's active context profile is "fitness," a second set of third parties when the user's active context profile is "health emergency," and no third parties when the user's active context profile is anything else.

Figure 1B:
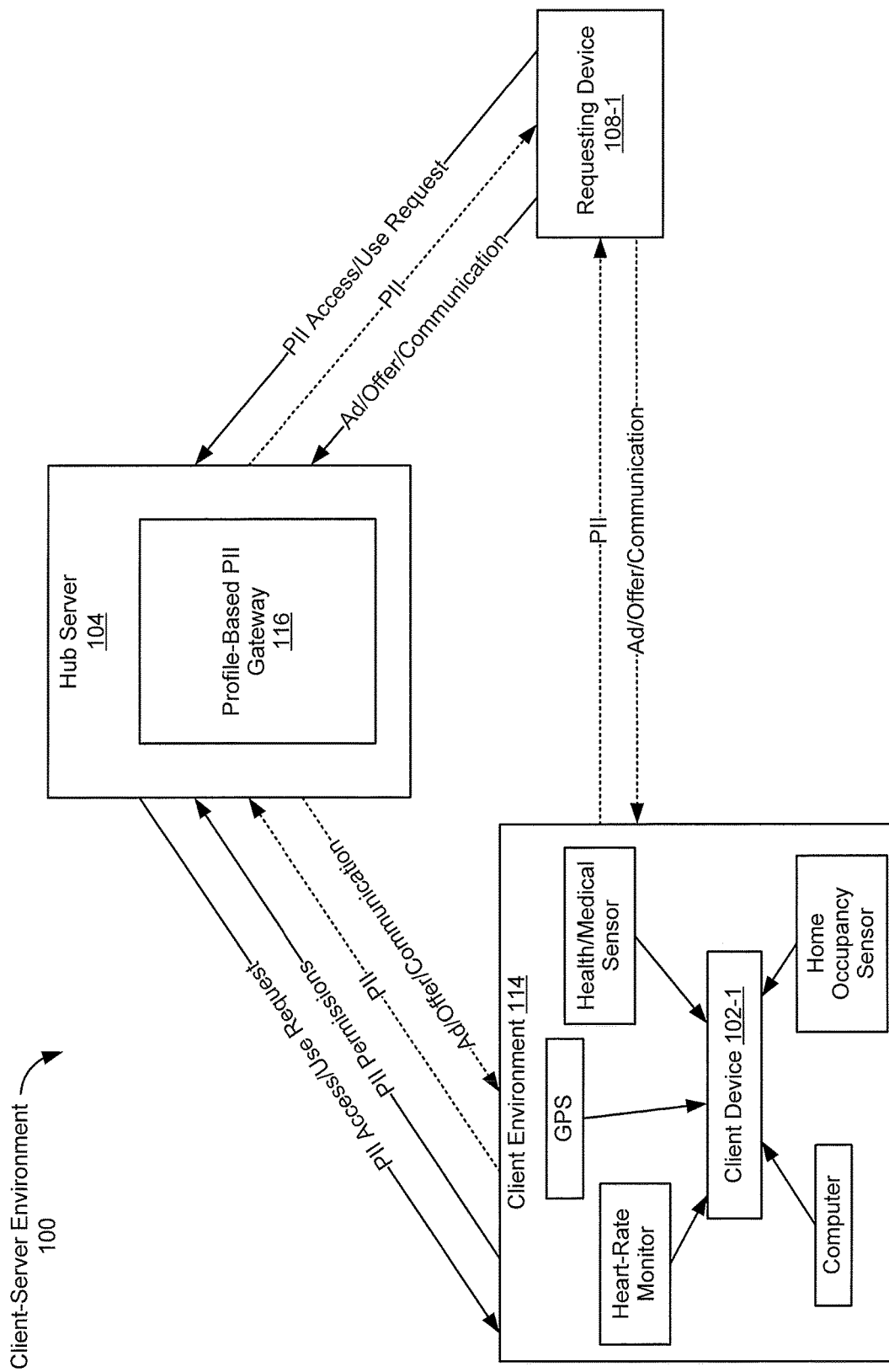

FIG. 1B, is another block diagram of the client-server environment 100, according to some implementations, showing exemplary communications between a client environment 114 and a requesting device 108-1 for provisioning and sharing PII.

FIG. 1B includes a client environment 114. The client environment 114 includes a client device 102-1 in communication with the hub server 104, as well as zero or more additional devices in communication with the hub server 104 and/or the client device 102-1. Dotted lines in FIG. 1B represent communications whose transmission or reception may be contingent upon approval or permission granted by the profile-based PII gateway 116. (Other communications in FIG. 1B may also be contingent on such approval or permission by the profile-based PII gateway 116 or any other component of the client-server environment 100, including other devices/components not shown.)

In some implementations, zero or more of the electronic devices in the client environment 114 also bypass (or are capable of bypassing) the hub server 104 to communicate directly with a requesting device 108-1. Electronic devices that communicate directly to the hub server 104 and/or the requesting device 108-1 are themselves considered to be client devices 102. Electronic devices that only or principally communicate with the hub server 104 and/or the requesting device 108-1 through a separate client device 102-1 are considered to be peripheral devices. As an example, a pedometer that communicates to a client device 102-1 via BLUETOOTH or other short-range communication technology is an example of a peripheral device.

In some implementations, the additional devices include global positioning (GPS) devices (e.g., vehicle or personal navigation devices), drones, RFID tags, iBeacons, heart-rate monitors, personal computers, health/medical/biometric sensors (e.g., blood pressure monitors, galvanic skin response sensors, body temperatures sensors, etc.), occupancy sensors, or the like—effectively any device which can or will be able to collect information which might be used either individually or as part of a set of information that constitutes PII.

FIG. 1B illustrates an exemplary process whereby a requesting device requests to access or use PII of a particular individual by sending a request to a hub server. The requesting device can initiate a request in response to a user input, or automatically (e.g., in response to an automatic detection of a condition.) The hub server facilitates the process of requesting and receiving permissions, restrictions, and/or authorizations from the individual, and providing the requested PII (or authorizing use of the PII) by the requesting device.

More specifically, the requesting device 108-1 sends a PII access/use request ("request") to the hub server 104. In some implementations, the request specifies one or more of: the particular PII being requested (e.g., the user's internet browsing history, the user's heart rate, etc.), what the information may used for, when the information may be used, whether (and with whom) the information may be shared, and the like. In some implementations, the request is accompanied with an identifier of a particular individual. For example, the entity associated with the hub server 104 (i.e., the company or entity that controls, operates, or is otherwise responsible for the hub server 104 or the services provided thereby) provides individual clients with a unique identifier.

Individuals may share this identifier with third parties, who may then request information, from the hub server 104, about the associated individual. By routing PII permissioning requests from multiple third parties through the hub server 104, control over such requests is centralized and standardized, allowing users a single and simple point of contact to control who has access to their PII, as well as what it may be used for, and when it may be used and/or received.

In response to receiving a request from a requesting device 108-1, the hub server 104 processes the request and sends a corresponding request (or forwards the request from the requesting device 108-1) to a device associated with the individual identified in the request.

The individual receives the request from the hub server. As noted above, the request includes information about the requesting entity as well as information about the particular PII being requested and how/when/for what purpose the PII will be used. In some implementations, the user is proactively alerted to the request, such as with a popup message on a screen, an audible alert, a notification icon, or the like. In some implementations, the request is placed into an inbox or queue of requests that the user reviews at any convenient time.

In some implementations, instead of sending a request to the user, the request is validated against a set of rules established by the user (either on their device or on the gateway), and is then further validated against their active context. Responses are thus automatically managed based on the pre-established rules and the user's active context.

One or more devices associated with the client environment 114 (e.g., the client device 102-1) sends PII permissions back to the hub server 104. In some implementations, the returned permissions include approval or denial of the request (in whole or in part, as described herein), as well as assignments of particular context profiles for which the permissions are granted. For example, a requesting device 108-1 may send a request to continuously receive the user's heart rate information for the purpose of monitoring and tracking the user's heart rate exertion levels and overall fitness. In response, the user may authorize the requestor to receive and use the date only when the user's "fitness" context profile is active, and restrict the access and/or use of the heart rate information when any other context profile is active. The hub server 104 stores the permissions received from individuals in the permissions database 106.

In some implementations, if the individual approves the request for PII (and, optionally, one or more other conditions are satisfied), the requested PII is sent to the requesting device 108-1, either directly or through the hub server 104.

In some implementations, the hub server 104 includes a profile-based PII gateway 116 that limits access to and/or use of PII data based on the active context profile of the user and the stored permissions granted to the requesting entities. For example, any time a requesting entity wishes to access and/or use PII of a particular user, it must confirm with the hub server 104 whether it is authorized to do so at that time. In response to receiving such a request, the profile-based PIT gateway 116 determines the user's active context profile, and then determines whether the user has permitted the requested PII to be shared with the requesting entity when that particular context profile is active. Additionally, in some implementations, a user may elect to initiate the process of sharing PII, in order to facilitate a transaction, for example (or for any purpose). In such instance, the user selects a context and initiates outbound sharing of information (including selected PII) with an entity, subject to any rules and/or restrictions imposed by the hub server 104, the profile-based PIT gateway 116, and/or any rules or restrictions associated with the user's context profiles.

As a specific example, if an entity requests heart rate information from a particular user, the profile-based PII gateway 116 determines that the user's active context profile is "fitness," and further determines that the user has authorized heart-rate information to be shared with the requesting entity when the "fitness" context profile is active. Thus, the profile-based PII gateway 116 will either (i) send the heart rate information to the requestor, (ii) inform the client device 1024 to send the heart rate information to the requestor, and/or (iii) inform the requestor that they are permitted to request the heart rate information from the client device 102-1.

While FIG. 1B shows PIT being sent directly from the client environment 114 to a requesting device 108-1, in some implementations, this communication is still governed by the profile-based PII gateway 116. For example, the PIT will only be sent to the requesting device 108-1 once either or both of the requesting device 108-1 and the client device 102-1 have received confirmation from the profile-based PIT gateway 116 that the communication is authorized.

The profile-based PII gateway 116 also controls whether a requesting device 108-1 is permitted to contact an individual with advertisements, offers, or other communications. In some implementations, the requesting device 108-1 sends an advertisement, offer, or other communication to the hub server 104, and the profile-based PII gateway 116 determines whether the individual's permissions allow that particular party to send communications to the individual based on the active context profile. If so, the communication is forwarded to the client device 102-1. If not, it is not forwarded to the client device 102-1 (though it might be stored for retrieval and review at a later stage by the user once an appropriate context profile becomes active). Alternatively, instead of sending the communication to the hub server 104, the requesting device 108-1 may request approval to send information to the client device, and the profile-based PII gateway 116 responds with an approval or a denial, and the requesting device 108-1 reacts accordingly by either sending or not sending the communication as appropriate.

The profile-based PIT gateway 116 allows users to establish permissions related to their PII and the third parties that can access their PII such that they share and receive information in a way that is relevant to their current context. For example, permitting the sharing of clothing size information to times when the user is in a "shopping" profile helps ensure that the user is not accosted with offers, advertisements, or other communications related to clothes shopping when the user is in a different context profile, such as "work," or "vacation." It also helps provide the user with offers, advertisements, or other communications that are particularly relevant and timely to their active context profile. Thus, when the user is in a "shopping" profile, he or she will be more likely to receive content related to clothing than to nearby athletic events or restaurants near his or her place of work, for example.

Imposing a limited set of permissions, however, can negatively impact the exposure of a user to desirable information. For example, limiting the third parties who may receive PII or contact a user with offers, advertisements, or other communications (or when they are permitted to do so) may prevent the user from learning about a product or service that they might be interested in. Accordingly, in some implementations, users are able to increase the permissions granted to one or more third parties such that additional PII is accessible to the third parties and/or the third parties can communicate to the user in additional ways or in additional contexts. Moreover, the hub server 104 allows users to change permissions of multiple third parties at one time, allowing them the benefit of increased exposure to desirable content without them having to individually change the permissions for each third party. Instead, the user can enter a "discovery mode" where additional permissions are granted to new and/or different third parties. Thereafter, the user can, with only a single request, exit the discovery mode and return each third party to the previously applicable permissions.

Discovery mode affects any of multiple possible permissions. In some implementations, discovery mode allows for the creation of an Interim Privacy Policy (IPP) with additional third parties, giving them the rights and receive and access a user's PII, or allowing additional third parties to contact a user. For example, a user's permissions may only allow a few specific third parties to access PII or send advertisements or offers to the user. When discovery mode is active, however, additional third parties are granted permissions to access the user's PII or send communications to the user. For another example, a user might be shopping for life insurance and under their normal mode would only be sharing their relevant PII (e.g., height, age, weight, health history, heart rate data, fitness data, blood chemistry, etc) with entities already approved by them to receive such information. By entering discovery mode, the user can permission and share this information with a broad set of competitors offering life insurance products, such that each has the same PII information and thus the user can receive a wide set of competitive and accurate personalized quotes. The permissioning of this PII data by the user while in discovery mode creates an IPP and thus enables the other providers to legally have the rights to use the users PII to help them bid for the business. Once the discovery mode is closed, the IPP ends and the related permission ceases.

In some implementations, discovery mode allows third parties to access additional PII information than they otherwise would not be permitted to access. For example, under normal operating modes, a retailer may be permitted to access a user's clothing sizes, whereas in discovery mode, that same retailer (and/or additional retailers) may also be permitted to access a user's browsing history, location, and the like.

In some implementations, discovery mode allows third parties to contact the user via additional communications options. For example, under normal operating modes, a third party may only be permitted to send emails to the user, whereas in discovery mode, that same third party (and/or additional third parties) may also be permitted to contact the user with text messages, pop-up advertisements, banner advertisements, displays on wearables, etc. As another example, under normal operating modes, a third party may only be permitted to send communications to a user's desktop computer, whereas in discovery mode, that same third party (and/or additional third parties) may also be permitted to contact the user on any associated electronic device (e.g., television, smartphone, wearable, vehicle "infotainment" system, etc.

Of course, discovery mode need not grant unlimited permissions to all third parties. Rather, in some implementations, a user can select how discovery mode affects the permissions granted to third parties. For example, one user may configure discovery mode such that permissions are granted to any and all third parties to access the user's PII and/or send communications to the user, and for any subject area. Another user, by contrast, may configure discovery mode such that only a small number of additional third parties are permitted to access the user's PII and/or send communications to the user. Accordingly, in some implementations, the behavior of discovery mode is user-specific and user-configurable.

In some implementations, additional modes, in addition to discovery mode, grant additional and/or different permissions to third parties when they are active. For example, in some implementations, an emergency mode allows any and all PII that may be helpful to rescue a user is sent to emergency responders, health professionals, family members, and/or the like (or access to PII is granted to the foregoing entities). Such PII may include, without limitation, current location, current medications, preexisting health conditions, medical records, and any appropriate biometric information such as heart rate, blood pressure, blood sugar levels, galvanic skin response, body temperature, etc. Thus, like discovery mode, emergency mode changes and/or overrides the permissions that are otherwise active as a result of a particular context profile being active. Thus, for example, if a user's active context profile has very few permissions (corresponding to a "do not disturb" or "family time" mode), emergency mode will expand the permissions so as to allow beneficial services to be provided to the user.

In some implementations, emergency mode is entered automatically upon detection of a certain condition. For example, emergency mode may be entered upon detection that a user has been in a car accident (e.g., based on accelerometer information from a smartphone, collision sensors in a vehicle, etc.), or upon detection that the user is undergoing a health emergency (e.g., based on heart rate, blood sugar, or other biometric information), or the like.

In some implementations, in addition to or instead of automatic selection, emergency mode is entered manually by a user. For example, a user may select emergency mode at any appropriate time, such as after becoming injured.

Figure 2:
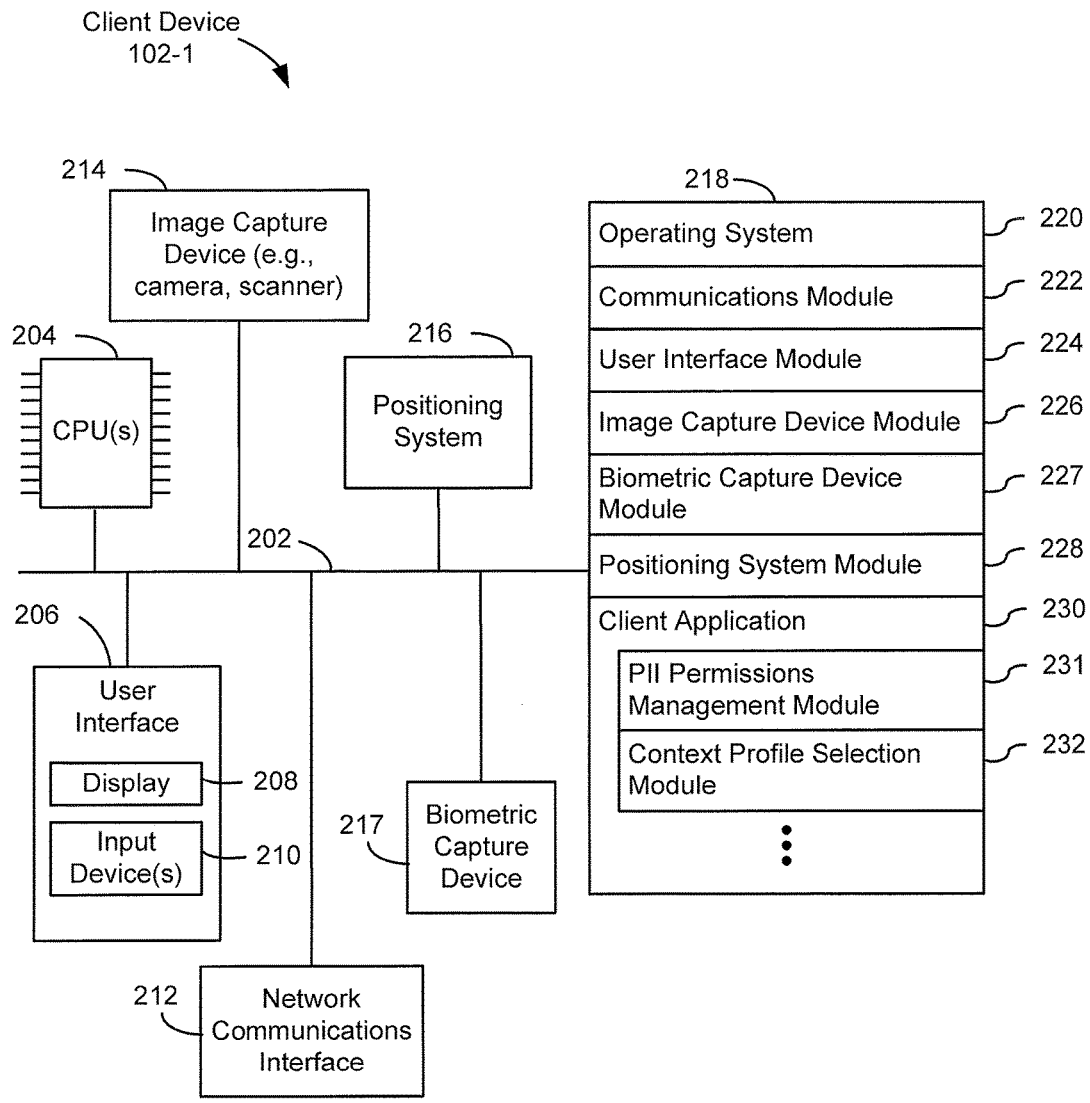
FIG. 2 is a block diagram illustrating a client computer device, in accordance with some implementations.

FIG. 2 is a block diagram illustrating a client device 102-1, in accordance with some implementations. While FIG. 2 illustrates one instance of a client device (i.e., client device 102-1), the figure and associated description applies equally to any client device (e.g., 102-1-102-*n*).

In some implementations, the client device 102-1 is any of: a desktop computer, a laptop computer, a tablet computer, a mobile electronic device (e.g., a "smart watch," a wearable electronic device, a fitness/health tracker, etc.), a mobile phone (e.g., a "smartphone"), a digital media player, or any other appropriate electronic device.

The client device 102-1 typically includes one or more CPUs 204, a user interface 206, at least one network communications interface 212 (wired and/or wireless), an image capture device 214, a positioning system 216, a biometric capture device 217, memory 218, and at least one communication bus 202 for interconnecting these components. Each communication bus 202 may include circuitry (sometimes called a chipset) that interconnects and controls communications between system components. In some implementations, the user interface 206 includes a display 208 and input device(s) 210 (e.g., keyboard, mouse, touchscreen, keypads, etc.).

The image capture device 214 is any device that is capable of capturing an image of a real-world scene or object. In some implementations, the image capture device 214 is a digital camera (including any appropriate lens(es), sensor(s), and other components). In some implementations it might be a remote image capturing device (e.g., on a drone or wearable).

The positioning system 216 includes devices and/or components for determining the location of the client device 102-1, including but not limited to global positioning system (GPS) sensors, radio receivers (e.g., for cell-tower triangulation, WiFi-based positioning, etc.), inertial sensors, and accelerometers. In some implementations, the client device 102-1 does not include (or does not rely on) a separate positioning system 216. For example, where the client device 102-1 is connected to the Internet (e.g., via the network communications interface 212), the location of the client device 102-1 can be determined using IP address geolocation techniques. Other techniques for determining the location of the client device, including those that rely on an inbuilt or connected positioning system and those that do not, are also contemplated. In some implementations, location may be defined by the network being connected to (e.g., in an airplane, or train or building) or other sensor information which might identify location.

The biometric capture device 217 includes devices and/or components for capturing biometric data from a person. In some implementations, the biometric capture device 217 is a fingerprint scanner. In some implementations, it is a retinal scanner. In some implementations, it is a facial scanner. In some implementations it is a voice recognition scanner. In some implementations, the biometric capture device 217 is a multi-purpose capture device that can capture multiple types of biometric data from a user (e.g., handprints, fingerprints, facial images, etc.). In some implementations, biometric capture devices 217 include any of a heart rate monitor, a galvanic skin response monitor, a blood sugar monitor, blood alcohol monitor, blood oxygen monitor, or any other biometric monitor/sensor that might either be external or internal. In some implementations, the biometric capture device 217 is a peripheral device (i.e., is not in the same housing as other components of the client device 102-1), and communicates with the client device 102-1 via one or more communication links, including, for example, BLUETOOTH, WiFi, or any other appropriate wired or wireless communication link(s).

Memory 218 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 218 may optionally include one or more storage devices remotely located from the CPU(s) 204 (e.g., a network-connected storage device or service, such as a "cloud" based storage service). Memory 218, or alternately the non-volatile memory device(s) within memory 218, includes a non-transitory computer readable storage medium. In some implementations, memory 218 or the computer readable storage medium of memory 218 stores the following programs, modules and data structures, or a subset thereof:

- an operating system 220 that includes procedures for handling various basic system services and for performing hardware dependent tasks;
- a communication module 222 that is used for connecting the client device 102-1 to other computers via the one or more network communication interfaces 212 (wired or wireless) and one or more communication networks, such as the Internet, other Wide Area Networks, Local Area Networks, Personal Area Networks, Metropolitan Area Networks, VPNs, local peer-to-peer and/or ad-hoc connections, and so on;
- a user interface module 224 that receives commands and/or inputs from a user via the user interface 206 (e.g., from the input device(s) 210, which may include keyboard(s), touch screen(s), microphone(s), pointing device(s), and the like), and provides user interface objects on a display (e.g., the display 208);
- an image capture device module 226 (including, for example, applications, drivers, etc.) that works in conjunction with the image capture device 214 to capture images, such as images or scans of physical documents, faces, real-world scenes, etc.;
- a biometric capture device module 227 that works in conjunction with the biometric capture device 217 (and/or the image capture device 214) for capturing biometric data of a user, including data relating to any appropriate physical or biological characteristic of a user;
- a positioning system module 228 that, in conjunction with the positioning system 216, determines a current location (e.g., latitude and longitude, street address, city, state, municipality, etc.) of the client device 102-1; and
- one or more client application module(s) 230 for enabling the client device 102-1 to perform the methods and/or techniques described herein, the client application module(s) 230 including but not limited to:
  - a PII permissions management module 231 for receiving user preferences relating to PII permissions, including what third parties may receive/access PII, what PII may be received/accessed by third parties, when PII may be received/accessed by third parties, how third parties may contact the user, what third parties may contact the user, when third parties may contact the user, etc., and for assigning permissions to one or more context profiles;
  - a context profile selection module 232 for receiving user selections of an active context profile and for detecting triggers for automatically selecting an active context profile.

In some implementations, the client device 102-1 includes a subset of the components and modules shown in FIG. 2. Moreover, in some implementations, the client device 102-1 includes additional components and/or modules not shown in FIG. 2.

Figure 3:
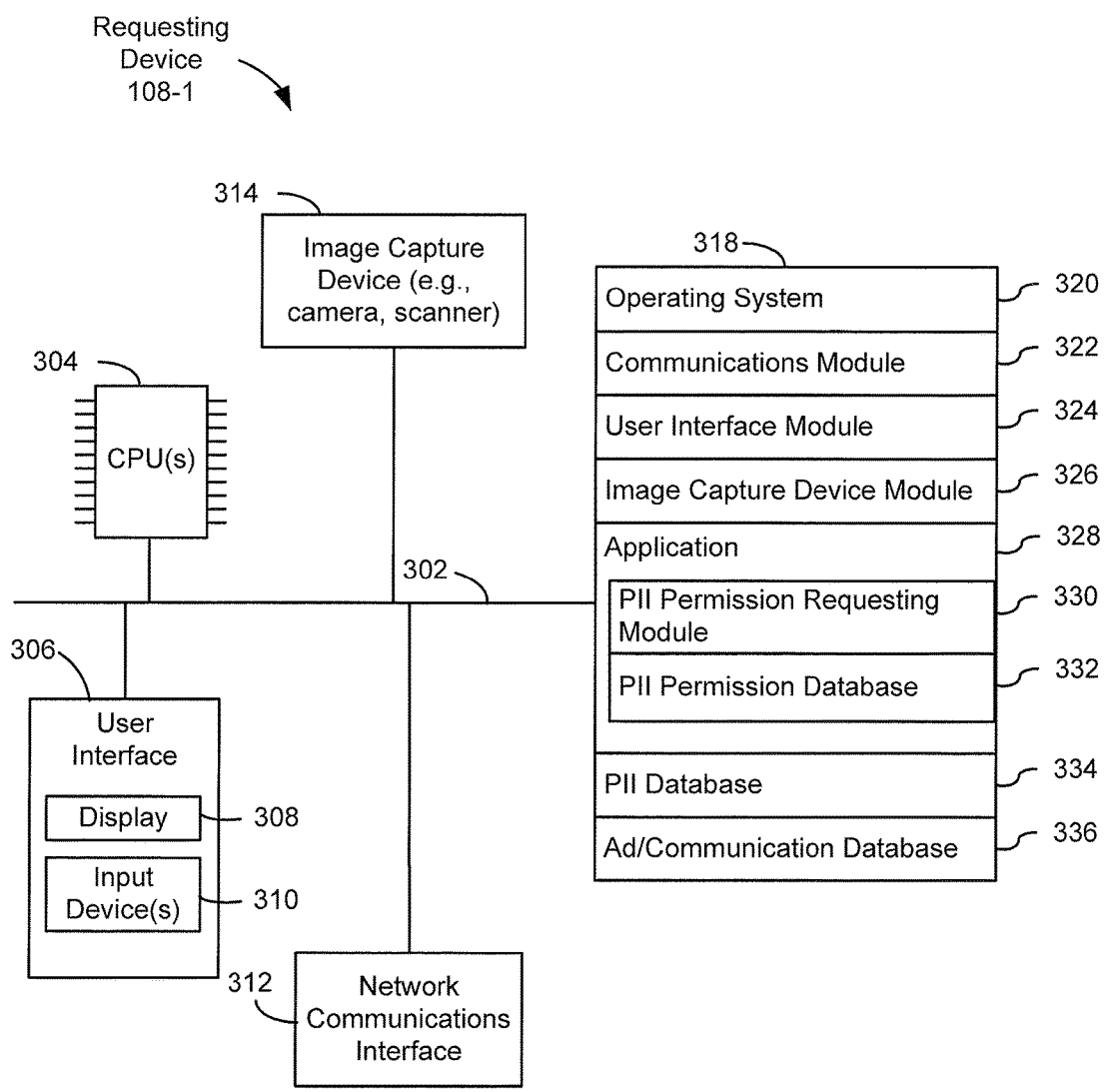
FIG. 3 is a block diagram illustrating a requesting computer device, in accordance with some implementations.

FIG. 3 is a block diagram illustrating a requesting device 108-1, in accordance with some implementations. While FIG. 3 illustrates one instance of a requesting device (i.e., requesting device 108-1), the figure and associated description applies equally to any requesting device (e.g., 108-1-108-n).

In some implementations, the requesting device 108-1 is any of: a desktop computer, a laptop computer, a tablet computer, a server computer (or server system), a mobile electronic device, a mobile phone, a vehicle, a digital media player, or any other appropriate electronic device (or a kiosk housing any of the aforementioned devices).

The requesting device 108-1 typically includes one or more CPUs 304, a user interface 306, at least one network communications interface 312 (wired and/or wireless), an image capture device 314, memory 318, and at least one communication bus 302 for interconnecting these components. Each communication bus 302 may include circuitry (sometimes called a chipset) that interconnects and controls communications between system components. In some implementations, the user interface 306 includes a display 308 and input device(s) 310 (e.g., keyboard, mouse, touchscreen, keypads, etc.).

The image capture device 314 is any device that is capable of capturing an image of a real-world scene or object. In some implementations, the image capture device 314 is a digital camera (including any appropriate lens(es), sensor(s), or other components). In some implementations, the image capture device is a scanner (e.g., a flatbed scanner). In some implementations, the image capture device 314 is incorporated into a common housing with the requesting device 108-1, or in a connected or external device capable of rendering image capture for the user (e.g., a drone etc).

Memory 318 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 318 may optionally include one or more storage devices remotely located from the CPU(s) 304. Memory 318, or alternately the non-volatile memory device(s) within memory 318, includes a non-transitory computer readable storage medium. In some implementations, memory 318 or the computer readable storage medium of memory 318 stores the following programs, modules and data structures, or a subset thereof:
- an operating system 320 that includes procedures for handling various basic system services and for performing hardware dependent tasks;
- a communication module 322 that is used for connecting the requesting device 108-1 to other computers via the one or more network interfaces 312 (wired or wireless) and one or more communication networks, such as the Internet, other Wide Area Networks, Local Area Networks, Personal Area Networks, Metropolitan Area Networks, VPNs, local peer-to-peer and/or ad-hoc connections, and so on;
- a user interface module 324 that receives commands and/or inputs from a user via the user interface 306 (e.g., from the input device(s) 310, which may include keyboard(s), touch screen(s), microphone(s), pointing device(s), and the like), and provides user interface objects on a display (e.g., the display 308);
- an image capture device module 326 (including, for example, applications, drivers, etc.) that works in conjunction with the image capture device 314 to capture images, such as images or scans of physical documents, faces, real-world scenes, etc.
- one or more application module(s) 328 for enabling the requesting device 108-1 to perform the methods and/or techniques described herein, the application module(s) 328 including but not limited to:
  - a PII permission requesting module 330 for requesting PII permissions from one or more client devices and/or hub servers; and
  - a PII permission database 332 for storing and managing previously granted PII permissions;
- a PII database 334 for storing PII, if authorized to do so, subject to any and all permissions relating to the PII; and
- an ad/communication database 336 for storing advertisements and/or other communications (e.g., content for email, physical mail, text/sms/mms messages, popup messages, etc.) that can be sent to client devices.

In some implementations, the requesting device 108-1 includes a subset of the components and modules shown in FIG. 3. Moreover, in some implementations, the requesting device 108-1 includes additional components and/or modules not shown in FIG. 3.

Figure 4:
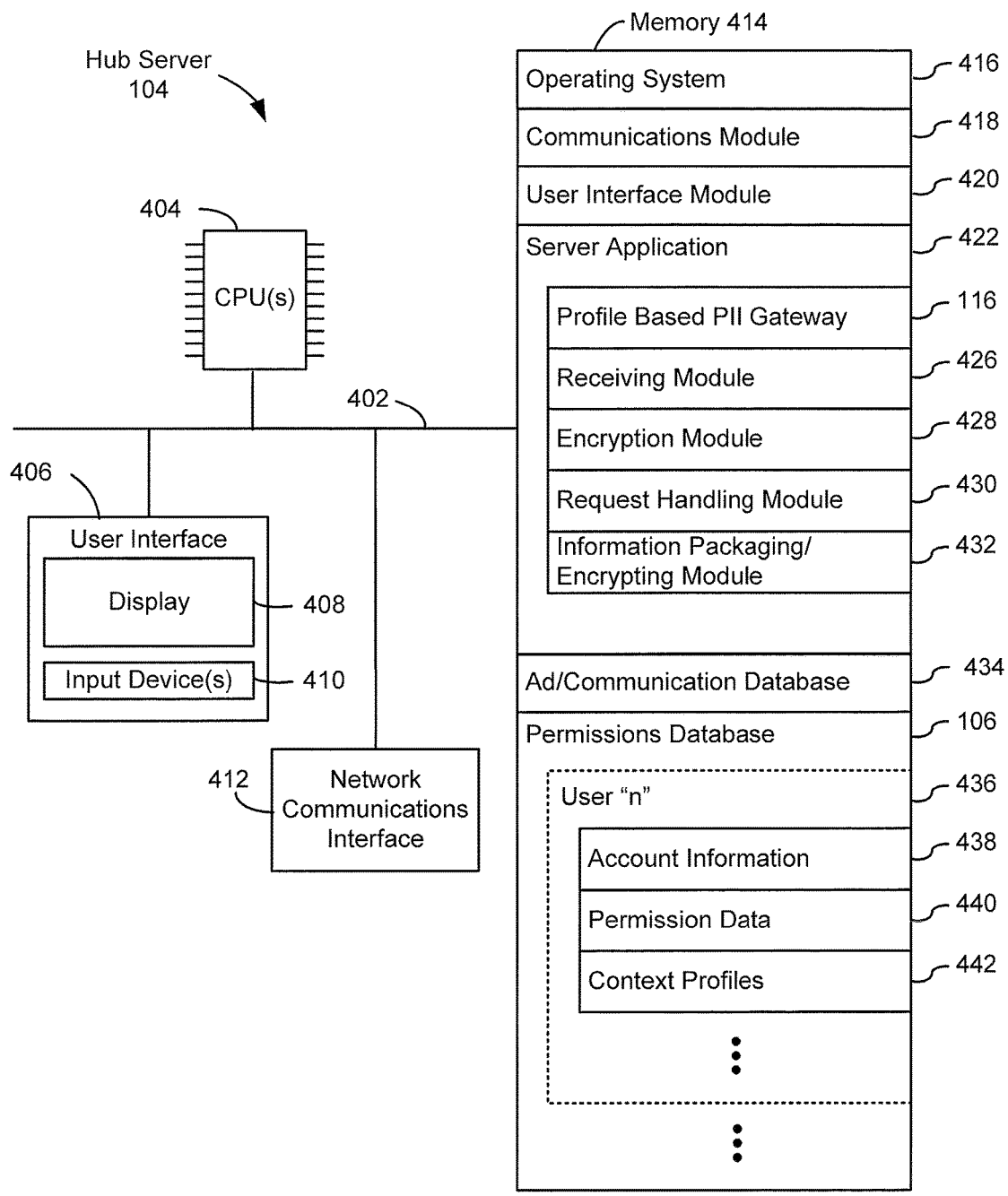
FIG. 4 is a block diagram illustrating a server computer device, in accordance with some implementations.

FIG. 4 is a block diagram illustrating a hub server 104, in accordance with some implementations. In some implementations, the hub server 104 is any of: a desktop computer, a laptop computer, a tablet computer, a server computer (or server system), a mobile electronic device, a mobile phone, a digital media player, or any other appropriate electronic device (or a kiosk housing any of the aforementioned devices).

The hub server 104 typically includes one or more CPUs 404, a user interface 406, at least one network communications interface 412 (wired and/or wireless), memory 414, and at least one communication bus 402 for interconnecting these components. Each communication bus 402 may include circuitry (sometimes called a chipset) that interconnects and controls communications between system components. In some implementations, the user interface 406 includes a display 408 and input device(s) 410 (e.g., keyboard, mouse, touchscreen, keypads, etc.).

Memory 414 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 414 may optionally include one or more storage devices remotely located from the CPU(s) 404. Memory 414, or alternately the non-volatile memory device(s) within memory 414, includes a non-transitory computer readable storage medium. In some implementations, memory 414 or the computer readable storage medium of memory 414 stores the following programs, modules and data structures, or a subset thereof:
- an operating system 416 that includes procedures for handling various basic system services and for performing hardware dependent tasks;
- a communication module 418 that is used for connecting the hub server 104 to other computers via the one or more network interfaces 412 (wired or wireless) and one or more communication networks, such as the Internet, other Wide Area Networks, Local Area Networks, Personal Area Networks, Metropolitan Area Networks, VPNs, local peer-to-peer and/or ad-hoc connections, and so on;
- a user interface module 420 that receives commands and/or inputs from a user via the user interface 406 (e.g., from the input device(s) 410, which may include keyboard(s), touch screen(s), microphone(s), pointing device(s), and the like), and provides user interface objects on a display (e.g., the display 408);
- one or more server application module(s) 422 for enabling the server 104 to perform the methods and/or techniques described herein, the server application module(s) 422 including but not limited to:
  - a profile based PII gateway 116 for receiving PII requests and/or communications directed to client devices from third parties, for receiving responses from client devices, and for forwarding communications from third parties to client devices and vice versa, based on user's active context profile and associated permissions;
  - a receiving module 426 for receiving information (e.g., PII) from remote devices (e.g., client devices 102-n, requesting devices 108-n), including but not limited to: documents, verification ratings, data extracted from documents, account information (e.g., name, address, social security number, password, account recovery questions/answers, biometric data, login credentials, etc.), etc.;

an optional encryption module 428 for encrypting user information (including but not limited to documents, verification ratings, data extracted from documents, account information, or any PII) for secure storage, if the user information was not encrypted before it was received by the server 104;

an information packaging/encrypting module 432 for gathering, packaging, and encrypting user information (including but not limited to documents, verification ratings, data extracted from documents, account information, or any PII) to be sent to or otherwise accessed by a requestor (e.g., an requesting device 108-n), and for sending the information to the requestor;

a permissions database 106 that includes information associated with a plurality of users; and an ad/communication database 434 for storing advertisements and/or other communications (e.g., content for email, physical mail, text/sms/mms messages, popup messages, etc.) that can be sent to client devices.

FIG. 4 further illustrates a portion of the user permissions database 106 relating to a user account 436 for an exemplary user "n." The user account 436 includes but is not limited to:

account information 438 associated with the user (e.g., name, address, social security number, password, account recovery questions/answers, biometric data, login credentials, etc.);

permission data 440 associated with a user, including what third parties may receive/access PII, what PII may be received/accessed by third parties, when PII may be received/accessed by third parties, how third parties may contact the user, what third parties may contact the user, when third parties may contact the user, etc., and for assigning permissions to one or more context profiles; and context profiles 442 associated with the user, including, for example, context profiles for work, travel, home, vacation, shopping, driving, fitness, boating, do-not-disturb, and the like.

In some implementations, any or all of the user information in the permissions database 106 is encrypted. Moreover, in some implementations, the service provider does not possess decryption keys for the user information. Accordingly, the service provider and/or the hub server 104 are not able to decrypt, view, read, or modify user information.

In some implementations, the hub server 104 includes a subset of the components and modules shown in FIG. 4. Moreover, in some implementations, the hub server 104 includes additional components and/or modules not shown in FIG. 4.

Figure 5A:
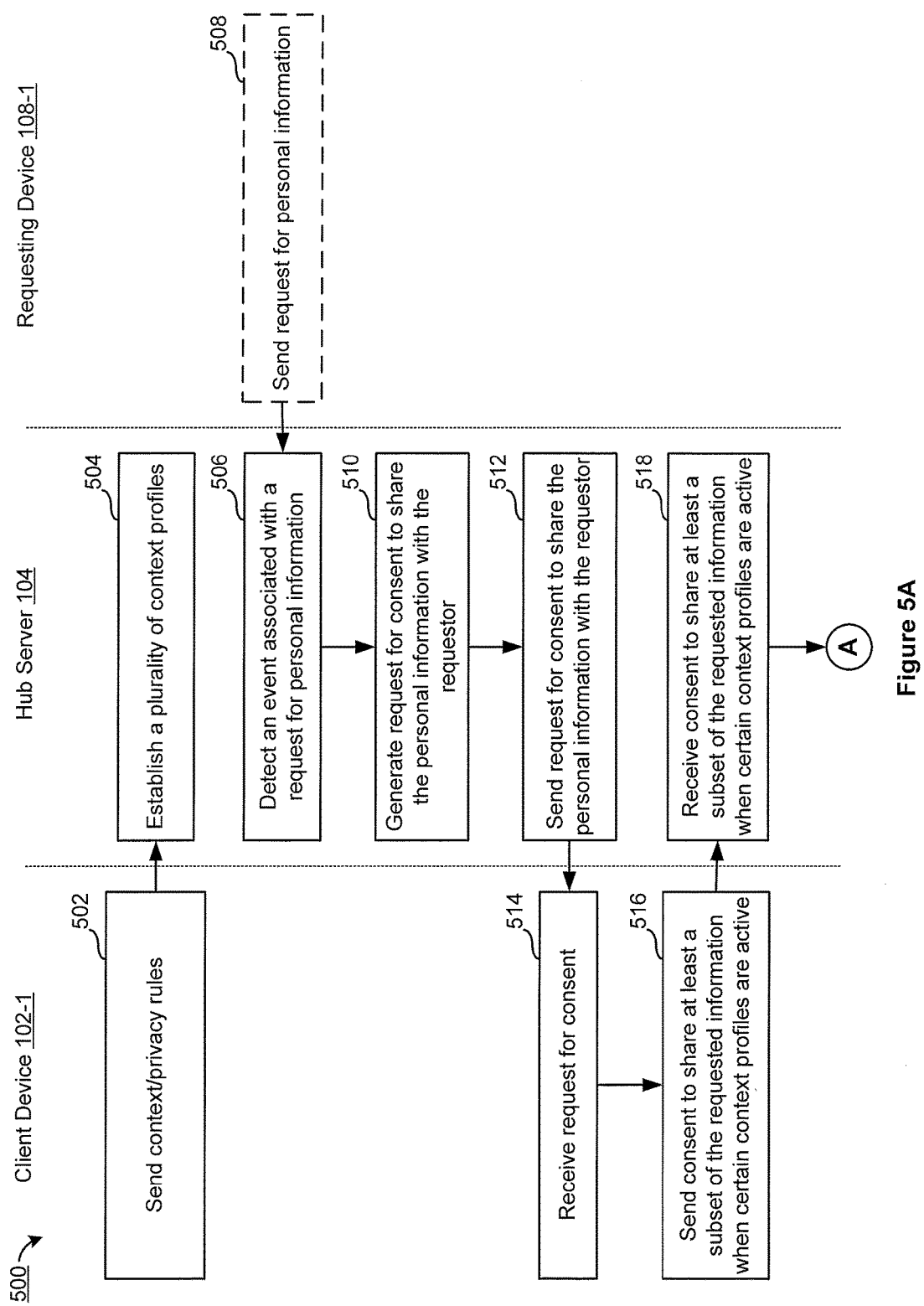
FIGS. 5A-5C are flow diagrams illustrating a method for providing access to personal information (PII) of a user, in accordance with some implementations.
Figure 5B:
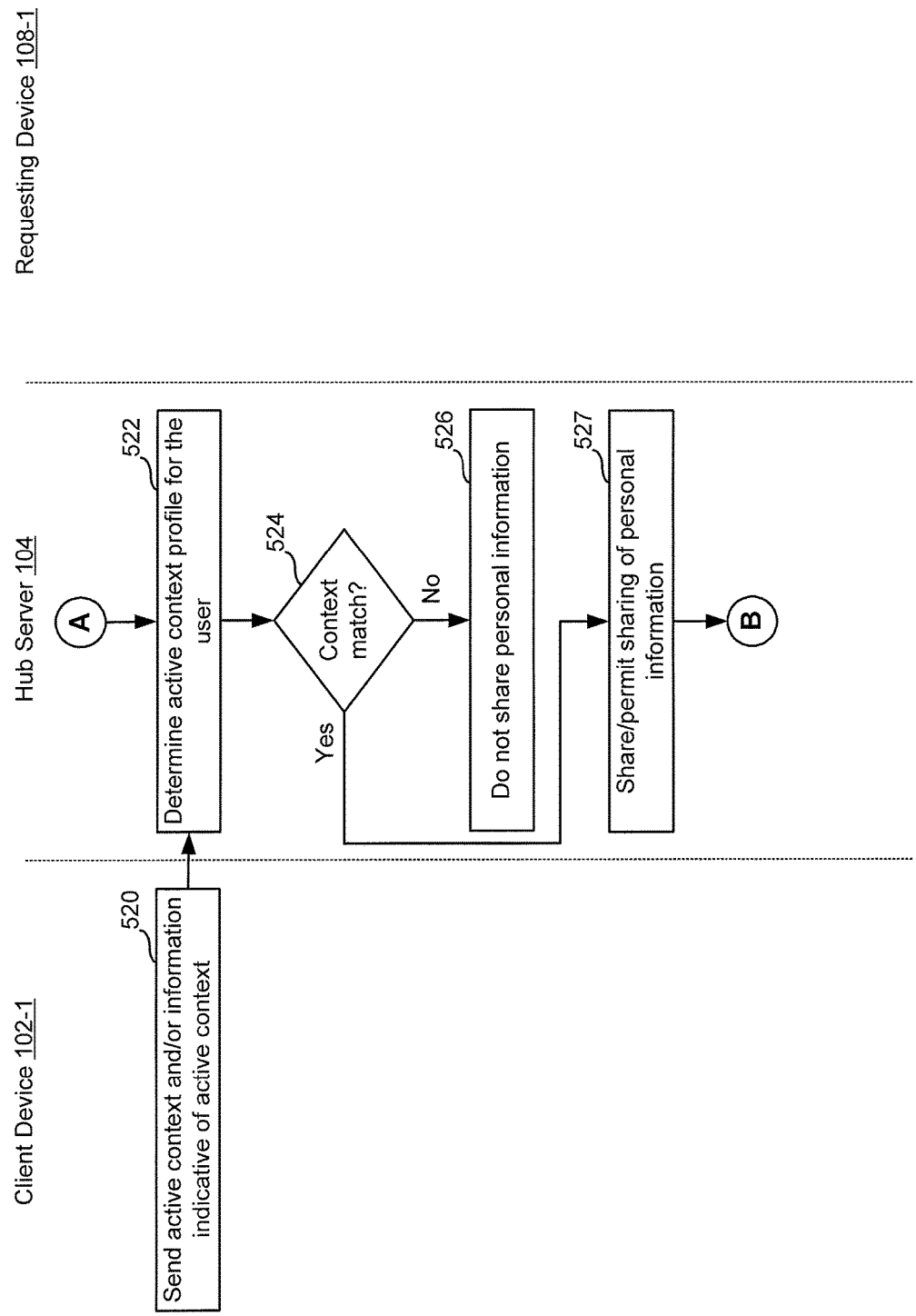
Figure 5C:
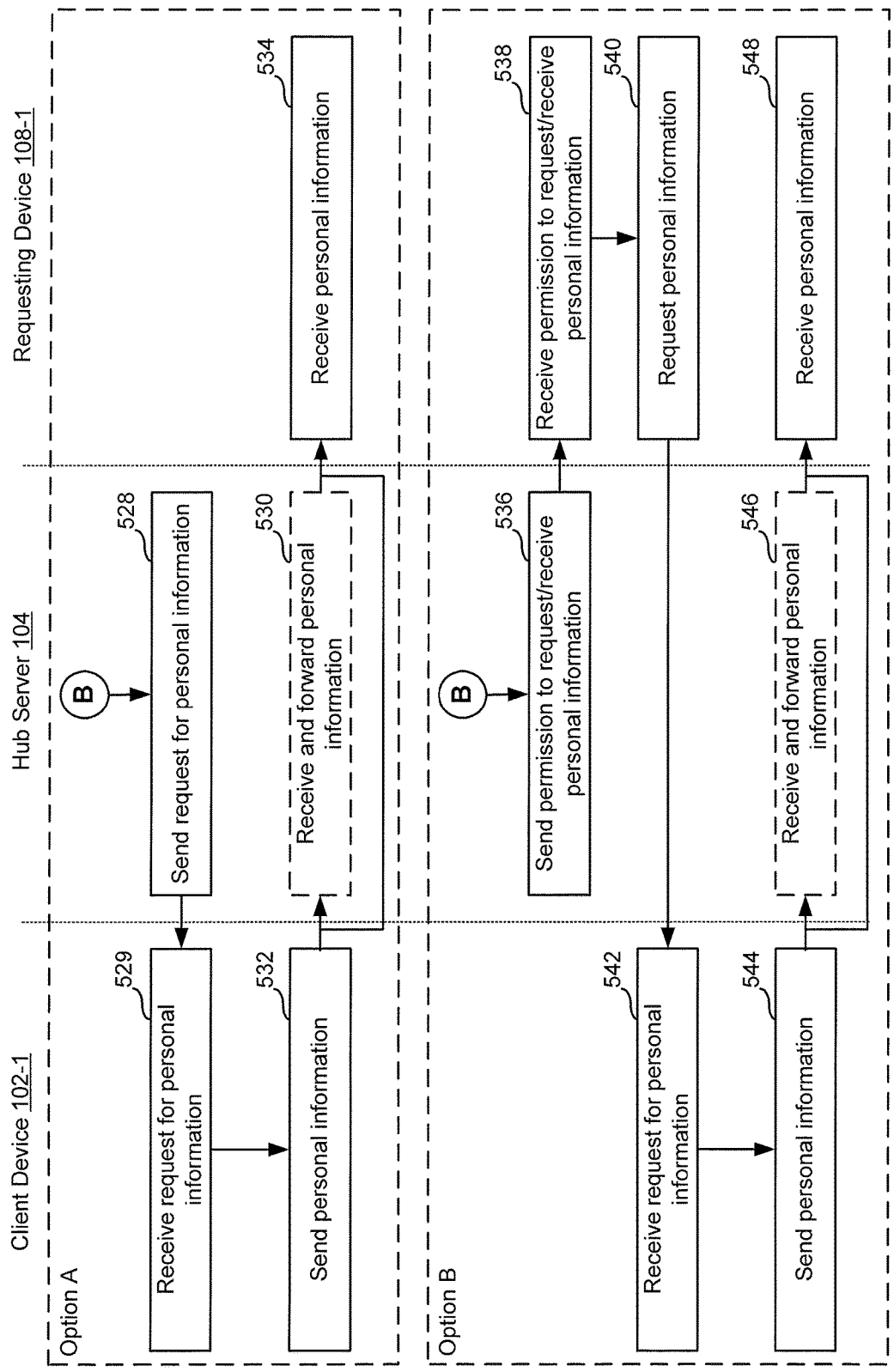

FIGS. 5A-5C are flow diagrams illustrating a method 500 for providing access to personal information (PII) of a user, in accordance with some implementations. Each of the operations shown in FIGS. 5A-5C may correspond to instructions stored in a computer memory or computer readable storage medium. In some implementations, the steps are performed at an electronic device with one or more processors (or cores) and memory storing one or more programs for execution by the one or more processors (or cores). For example, in some implementations, the steps are performed at any one (or any combination) of the client device 102-1, the hub server 104, and the requesting device 108-1. Moreover, the individual steps of the method may be distributed among the multiple electronic devices in any appropriate manner.

Any or all of the communications between devices described with respect to FIGS. 5A-5C are, in some implementations, secured and/or encrypted using any appropriate security and/or encryption techniques, including but not limited to Hypertext Transport Protocol Secure (HTTPS), Secure Sockets Layer (SSL), Transport Layer Security (TLS), Secure Shell (SSH), Internet Protocol Security (IPSec), public key encryption, and the like (including any appropriate yet to be developed security and/or encryption method).

The method includes establishing a plurality of context profiles for a user. In some implementations, context profiles are automatically triggered (e.g., a detection that user is in a car triggers a "travel" profile). In some implementations, context profiles relate to one or more aspects of the user's environment, current activity, or current interest(s). In some implementations, the user manually selects an active context profile.

The method further includes detecting an event associated with a request for personal information of the user. In some implementations, the event corresponds to a requesting entity asking for PII for a particular user, a requesting entity supplying a unique identifier of a particular user, etc.

The method further includes generating a request for consent or permission to share the personal information of the user with a third party. In some implementations, the request includes an option for the user to approve or deny permission for select items of requested information (i.e., less than or more than what is included in the request), and an option for the user assign the permissions (or denial of the permissions) to particular profiles of the plurality of context profiles.

The method further includes sending, to the user, the request for consent or permission to share the personal information of the user with the third party.

The method further includes receiving, from the user, consent to share at least a subset of the requested personal information with the third party when at least a first context profile, of the plurality of context profiles, is active. In particular, consent is tied to specific profiles; i.e., the user may consent to sharing of personal information with the particular third party in some profiles but not in other profiles. In some implementations, the method further comprises receiving, from the user, denial of consent to share at least a subset of the requested personal information with the third party when at least a second context profile, of the plurality of context profiles, is active. Thus, for example, a user can permit a third party to access and/or use PII (e.g., the user's height, weight, clothing size, and shopping habits) when the user is in a first profile (e.g., a "shopping" profile), but not when the user is in another profile (e.g., a "work" profile).

The method further includes determining an active context profile for the user based on one or more signals indicative of the user's context. The signals can be from any of multiple devices, calendars, schedules or the like. For example, a vehicle can send a signal to an appropriate device (e.g., a client device 102 and/or the hub server 104) when the vehicle is being driven to cause a "driving" context profile to be active. In some implementations, the signals indicative of the user's context correspond to a manual selection of a particular context profile.

The method further includes determining whether the active context profile matches the first context profile. In accordance with a determination that the active context profile matches the first context profile, the method includes sharing the personal information of the user with the third party. In accordance with a determination that the active context profile does not match the first context profile, the method includes not sharing the personal information of the user with the third party.

In some implementations, detecting the event associated with the request for personal information of the user comprises receiving a request for the personal information of the user.

In some implementations, the active context profile for the user is determined automatically without user input. For example, the active context profile is based on heuristics about the user's location, activity, etc., including whether the user is driving, working out, at home, at work, at a shopping establishment, etc.

In some implementations, the method further includes, in accordance with a determination that the active context profile matches the first context profile, permitting the third party to contact the user. The third party may be permitted to contact the user via any appropriate communication technique, including a banner advertisement, direct message (email, text, etc.), voice call/alert, and the like. In accordance with a determination that the active context profile does not match the first context profile, the method further includes not permitting the third party to contact the user.

In some implementations, the method further includes receiving a communication from the third party. The communication is addressed to or otherwise intended for a particular user. The method further includes, in accordance with a determination that the active context profile matches the first context profile, forwarding the communication (e.g., an email, text, ad banner, voice call/alert, etc.) to the user. In accordance with a determination that the active context profile does not match the first context profile, the method includes not forwarding the communication to the user.

Also described is a method for providing increased permissions to personal information of a user (e.g., via a "discovery" mode), in accordance with some implementations. In some implementations, the steps are performed at an electronic device with one or more processors (or cores) and memory storing one or more programs for execution by the one or more processors (or cores). For example, in some implementations, the steps are performed at any one (or any combination) of the client device 102-1, the hub server 104, and the requesting device 108-1. Moreover, the individual steps of the method may be distributed among the multiple electronic devices in any appropriate manner.

Any or all of the communications between devices described with respect to FIGS. 5A-5C are, in some implementations, secured and/or encrypted using any appropriate security and/or encryption techniques, including but not limited to Hypertext Transport Protocol Secure (HTTPS), Secure Sockets Layer (SSL), Transport Layer Security (TLS), Secure Shell (SSH), Internet Protocol Security (IP-Sec), public key encryption, and the like (including any appropriate yet to be developed security and/or encryption method).

The method includes establishing a plurality of context profiles for a user, wherein at least one context profile of the plurality of context profiles is associated with one or more of the following:

A set of one or more subject areas pertinent to the at least one context profile. Subject areas pertinent to a context profile include categories of goods or services that are relevant to a particular context. For example, subject areas pertinent to a travel profile include, for example, gas stations, food, auto repair, etc. Subject areas pertinent to a home profile include, for example, television/entertainment information, food delivery, home goods, etc. Subject areas pertinent to a shopping profile include, for example, retail stores, clothes, electronics, any product classes associated with a user profile, etc.

A first set of zero or more permissions identifying respective third parties with which personal information can be shared when the at least one context profile is active. In particular, each context profile identifies with whom PII can be shared (and/or who can use the user's PII) when that context profile is active.

A second set of zero or more permissions identifying what personal information can be shared with respective third parties when the at least one context profile is active. In particular, each context profile identifies zero or more categories, classes, or instances of personally identifiable information that can be shared with or accessed/used by respective third parties. For example, the second set of permissions may include a permission indicating that heart rate and location information can be shared with a particular fitness monitoring service when the active context is "fitness."

A third set of zero or more permissions identifying respective third parties that are permitted to contact the user when the at least one context profile is active. In particular, only some third parties (e.g., retailers, advertisers, service providers, etc.) are permitted to contact the user when a particular profile is active. For example, a clothing retailer may be permitted to contact the user (e.g., via email, banner advertisement, etc.) when the user's "shopping" profile is active.

A fourth set of zero or more permissions identifying how respective third parties may contact the user when the at least one context profile is active (e.g., via email, banner advertisements (browser/application based), etc. when the at least one context profile is active:

The method further includes, when operating in a regular mode, performing at least one of the following actions. (In some implementations, a regular mode corresponds to a mode where the established permissions associated with the context profile are enforced; e.g., only approved third parties can receive approved information, and only approved third parties can contact the user, and only via approved communication types.)

Sharing personal information with respective third parties in accordance with the first set of one or more permissions and the second set of one or more permissions (e.g., providing PII to certain third parties and refusing to provide PII to other third parties).

Receiving information from respective third parties in accordance with the third set of one or more permissions and the fourth set of one or more permissions (e.g., receiving emails, advertisements, text messages, banner ads, etc., from certain third parties, and refusing to receive communications from other third parties)

The method further includes, when in a discovery mode, performing at least one of the following. (In some implementations, a discovery mode corresponds to a mode where the context of the profile still applies, but additional permissions are granted, for example, to allow other not-yet-approved third parties access a user, and/or to allow third parties to access a user via additional communications methodologies that were not previously permitted (e.g., banner ads are allowed from a particular third party when in discovery mode, but are otherwise disallowed)).

Sharing personal information with first additional third parties in accordance with an expanded version of the first set of zero or more permissions. For example, when a shopping profile is active, a user may allow a certain set of retailers to receive and/or use PII. In the discovery mode, however, additional retailers who are not otherwise permitted to receive and/or use PII will be permitted to do so. In some implementations, the first additional third parties are each associated with at least one subject area of the set of one or more subject areas pertinent to the at least one context profile. Thus, if a discovery mode for a travel context profile will only grant expanded permissions to additional third parties who are associated with subject areas such as gas stations, food, auto repair, etc.

Sharing additional personal information with respective third parties in accordance with an expanded version of the second set of zero or more permissions. For example, when a shopping profile is active, a user's clothing size may be shared with a particular set of third parties. In the discovery mode, additional information is shared, such as the user's age, purchase history, previous purchases, location, and the like.

Receiving information from second additional third parties in accordance with an expanded version of the third set of zero or more permissions. For example, in a shopping profile, certain retailers are permitted to send information, such as advertisements, emails, and the like, to the user. In discovery mode, additional retailers would be permitted to do so. In some implementations, the second additional third parties are each associated with at least one subject area of the set of one or more subject areas pertinent to the at least one context profile. For example, in a shopping profile, the additional third parties may be restricted to other retailers. Thus, while additional, otherwise unauthorized third parties may send information to the user, the information would still be pertinent to the user's otherwise active context profile.

Receiving information from respective third parties in accordance with an expanded version of the fourth set of zero or more permissions. As noted above, the fourth set of permissions relates to how a third party can contact a user. Accordingly, an expanded version of the fourth set of permissions allows third parties to use additional modes of communication that are not otherwise permitted. For example, a retailer that is only permitted to contact the user by email when the normal mode is active would be able to use additional modes of communication (e.g., text messages, pop-up ads, etc.) when the discovery mode is active.

As noted above, discovery mode need not grant full permissions to all possible third parties. Rather, the additional permissions granted in discovery mode may be established by each individual user, and may be only a small increase in permissions.

In some implementations, the fourth set of one or more permissions identifying how third parties may contact the user includes a first subset of permissions identifying times when third parties are permitted to contact the user; and a second subset of permissions identifying communication types that third parties are permitted to use to contact the user.

In some implementations, the fourth set of one or more permissions identifying how third parties may contact the user includes a third subset of permissions identifying times when third parties are not permitted to contact the user; and a fourth subset of permissions identifying communication types that third parties are not permitted to use to contact the user.

The methods illustrated in FIGS. 5A-5C and described above may be governed by instructions that are stored in a computer readable storage medium and that are executed by at least one processor of at least one electronic device (e.g., one or more client devices 102-$n$, one or more requesting devices 108-$n$, or a hub server 104). Each of the operations shown in FIGS. 5A-5C may correspond to instructions stored in a non-transitory computer memory or computer readable storage medium. In various implementations, the non-transitory computer readable storage medium includes a magnetic or optical disk storage device, solid state storage devices, such as Flash memory, or other non-volatile memory device or devices. The computer readable instructions stored on the non-transitory computer readable storage medium may be in source code, assembly language code, object code, or other instruction format that is interpreted and/or executable by one or more processors (or cores).

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for providing access to personal information of a user, comprising:
   at a server system including one or more electronic devices with one or more processors and memory storing one or more programs for execution by the one or more processors:
      establishing a plurality of context profiles for a user, wherein:
         at least a first context profile of the plurality of context profiles, when active, is configured to operate in one of two or more modes that includes a normal mode and at least one expanded permission mode;
         an active context profile of the plurality of context profiles corresponds to a current context of a user device;
         an active mode of the active context profile is the normal mode or a respective expanded permission mode of the at least one expanded permission mode; and
         the first context profile of the plurality of context profiles includes:
            (i) a set of one or more subject areas pertinent to the first context profile;
            (ii) a first set of one or more permissions identifying a first set of third parties with which the personal information of the user can be shared when the first context profile is active;
            (iii) a second set of one or more permissions identifying what personal information of the user can be shared with the first set of third parties when the first context profile is active;
            (iv) a third set of one or more permissions identifying a second set of third parties that are permitted to contact the user when the first context profile is active; and
            (v) a fourth set of one or more permissions identifying how the second set of third parties may contact the user when the first context profile is active;
      in accordance with a determination that the active context profile for the user device is the first context profile and the active mode of the user device is the normal mode of the first context profile, performing at least one of:
         sharing the identified personal information of the user with the first set of third parties in accordance with the first set of one or more permissions and the second set of one or more permissions; and
         receiving information from the second set of third parties in accordance with the third set of one or more permissions and the fourth set of one or more permissions;
      detecting a mode-switching event that changes the active mode of the user device from the normal mode of the first context profile to the expanded permission mode of the first context profile; and
      in response to detecting the mode-switching event, performing a permission expansion for the first context profile that includes:
         (i) sharing, in accordance with an expanded version of the first set of one or more permissions, the identified personal information of the user with a first expanded set of third parties that includes the first set of third parties and at least one additional third party, wherein the at least one additional third party is associated with at least one subject area of the set of one or more subject areas pertinent to the first context profile; and
         (ii) receiving, in accordance with an expanded version of the third set of one or more permissions, information from a second expanded set of third parties that includes the second set of third parties and at least one additional third party, wherein the at least one additional third party is associated with at least one subject area of the set of one or more subject areas pertinent to the first context profile.

2. The method of claim 1, wherein the permission expansion for the first context profile includes receiving information from the second set of third parties in accordance with an expanded version of the fourth set of one or more permissions.

3. The method of claim 2, wherein the fourth set of one or more permissions identifying how the first set of third parties may contact the user includes:
   a first subset of permissions identifying times when the first set of third parties are permitted to contact the user; and
   a second subset of permissions identifying communication types that the first subset of third parties are permitted to use to contact the user.

4. The method of claim 3, wherein the fourth set of one or more permissions identifying how the first set of third parties may contact the user includes:
   a third subset of permissions identifying times when the first set of third parties are not permitted to contact the user; and
   a fourth subset of permissions identifying communication types that the first set of third parties are not permitted to use to contact the user.

5. The method of claim 1, wherein:
the plurality of context profiles is stored on a first electronic device of the one or more electronic devices,
the personal information of the user is stored on a second electronic device of the one or more electronic devices, and
the second electronic device is distinct from the first electronic device.

6. The method of claim 1, wherein detecting the mode-switching event includes receiving an indication of a mode-switching condition that is automatically detected by a remote device, wherein the remote device is the user device or a peripheral device of the user device.

7. The method of claim 1, wherein detecting the mode-switching event includes receiving an indication of user input detected at the user device.

8. The method of claim 1, wherein the determination that the active context profile for the user device is the first context profile is based on one or more signals that indicate the current context of the user device.

9. The method of claim 1, wherein the determination that the active context profile for the user device is the first context profile is based on user input that indicates the active context profile.

10. The method of claim 1, including, in accordance with a determination that the active context profile for the user device is a second context profile, forgoing sharing the identified personal information of the user with the first set of third parties.

11. The method of claim 1, wherein the permission expansion for the first context profile includes sharing additional personal information of the user with the first set of third parties in accordance with an expanded version of the second set of one or more permissions.

12. The method of claim 1, wherein the set of one or more subject areas pertinent to the first context profile include at least one of a category of goods that are relevant to the first context profile or a category of services that are relevant to the first context profile.

13. A system including one or more electronic devices for providing access to personal information of a user, comprising:
one or more processors;
memory; and
one or more programs, wherein the one or more programs are stored in the memory and configured to be executed by the one or more processors, the one or more programs including instructions for:
establishing a plurality of context profiles for a user, wherein:
at least a first context profile of the plurality of context profiles, when active, is configured to operate in one of two or more modes that includes a normal mode and at least one expanded permission mode;
an active context profile of the plurality of context profiles corresponds to a current context of a user device;
an active mode of the active context profile is the normal mode or a respective expanded permission mode of the at least one expanded permission mode; and
the first context profile of the plurality of context profiles includes:
(i) a set of one or more subject areas pertinent to the first context profile;
(ii) a first set of one or more permissions identifying a first set of third parties with which the personal information of the user can be shared when the first context profile is active;
(iii) a second set of one or more permissions identifying what personal information of the user can be shared with the first set of third parties when the first context profile is active;
(iv) a third set of one or more permissions identifying a second set of third parties that are permitted to contact the user when the first context profile is active; and
(v) a fourth set of one or more permissions identifying how the second set of third parties may contact the user when the first context profile is active;
in accordance with a determination that the active context profile for the user device is the first context profile and the active mode of the user device is the normal mode of the first context profile, performing at least one of:
sharing the identified personal information of the user with the first set of third parties in accordance with the first set of one or more permissions and the second set of one or more permissions; and
receiving information from the second set of third parties in accordance with the third set of one or more permissions and the fourth set of one or more permissions;
detecting a mode-switching event that changes the active mode of the user device from the normal mode of the first context profile to the expanded permission mode of the first context profile; and:
in response to detecting the mode-switching event, performing a permission expansion for the first context profile that includes:
(i) sharing, in accordance with an expanded version of the third set of one or more permissions, the identified personal information of the user with a first expanded set of third parties that includes the first set of third parties and at least one additional third party, wherein the at least one additional third party is associated with at least one subject area of the set of one or more subject areas pertinent to the first context profile; and
(ii) receiving, in accordance with an expanded version of the third set of one or more permissions, information from a second expanded set of third parties that includes the second set of third parties and at least one additional third party, wherein the at least one additional third party is associated with at least one subject area of the set of one or more subject areas pertinent to the first context profile.

14. The system of claim 13, wherein:
the plurality of context profiles is stored on a first electronic device of the one or more electronic devices,
the personal information of the user is stored on a second electronic device of the one or more electronic devices, and
the second electronic device is distinct from the first electronic device.

15. A non-transitory computer readable storage medium storing one or more programs comprising instructions, which when executed by one or more electronic devices, cause the one or more devices to:

establish a plurality of context profiles for a user, wherein:
  at least a first context profile of the plurality of context profiles when active, is configured to operate in one of two or more modes that includes a normal mode and at least one expended permission mode;
  an active context profile of the plurality of context profiles corresponds to a current context of a user device;
  an active mode of the active context profile is the normal mode or an expanded permission mode; and
  the first context profile of the plurality of context profiles includes:
    (i) a set of one or more subject areas pertinent to the first context profile;
    (ii) a first set of one or more permissions identifying a first set of third parties with which the personal information of the user can be shared when the first context profile is active;
    (iii) a second set of one or more permissions identifying what personal information of the user can be shared with the first set of third parties when the first context profile is active;
    (iv) a third set of one or more permissions identifying a second set of third parties that are permitted to contact the user when first context profile is active; and
    (v) a fourth set of one or more permissions identifying how the second set of third parties may contact the user when the first context profile is active;
  in accordance with a determination that the active context profile for the user device is the first context profile and the active mode of the user device is the normal mode of the first context profile, perform at least one of:
    share the identified personal information of the user with the first set of third parties in accordance with the first set of one or more permissions and the second set of one or more permissions; and
    receive information from the second set of third parties in accordance with the third set of one or more permissions and the fourth set of one or more permissions; and
  detect a mode-switching event that changes the active mode of the user device from the normal mode of the first context profile to the expanded permission mode of the first context profile; and
  in response to detecting the mode-switching event, perform a permission expansion for the first context profile that includes:
    (i) sharing, in accordance with an expanded version of the first set of one or more permissions, the identified personal information of the user with a first expanded set of third parties that includes the first set of third parties and at least one additional third party, wherein the at least one additional third party is associated with at least one subject area of the set of one or more subject areas pertinent to the first context profile; and
    (ii) receiving, in accordance with an expanded version of the third set of one or more permissions, information from a second expanded set of third parties that includes the second set of third parties and at least one additional third party, wherein the at least one additional third party is associated with at least one subject area of the set of one or more subject areas pertinent to the at least one context profile.

16. The computer readable storage medium of claim 15, wherein:
  the plurality of context profiles is stored on a first electronic device of the one or more electronic devices,
  the personal information of the user is stored on a second electronic device of the one or more electronic devices, and
  the second electronic device is distinct from the first electronic device.

* * * * *

UNITED STATES PATENT AND TRADEMARK OFFICE
CERTIFICATE OF CORRECTION

| | | |
|---|---|---|
| PATENT NO. | : 10,354,090 B2 | Page 1 of 1 |
| APPLICATION NO. | : 14/874345 | |
| DATED | : July 16, 2019 | |
| INVENTOR(S) | : Lacey et al. | |

It is certified that error appears in the above-identified patent and that said Letters Patent is hereby corrected as shown below:

In the Claims

Claim 15, Column 25, Line 5, delete "one expended permission" and insert --one expanded permission--.

Signed and Sealed this
First Day of October, 2019

Andrei Iancu
*Director of the United States Patent and Trademark Office*